United States Patent
Vanimisetti et al.

(10) Patent No.: US 9,561,621 B2
(45) Date of Patent: Feb. 7, 2017

(54) METHOD AND APPARATUS TO MITIGATE THE BOND-LINE READ-OUT DEFECT IN ADHESIVE-BONDED COMPOSITE PANELS

(75) Inventors: Sampath K. Vanimisetti, Karnataka (IN); Chen-Shih Wang, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 809 days.

(21) Appl. No.: 13/540,102

(22) Filed: Jul. 2, 2012

(65) Prior Publication Data

US 2013/0309436 A1 Nov. 21, 2013

(30) Foreign Application Priority Data

May 21, 2012 (IN) .............................. 578/KOL/2012

(51) Int. Cl.
*B29C 65/14* (2006.01)
*B29C 65/00* (2006.01)
(Continued)

(52) U.S. Cl.
CPC ..... *B29C 66/91951* (2013.01); *B29C 65/1425* (2013.01); *B29C 65/4835* (2013.01); *B29C 65/787* (2013.01); *B29C 66/1122* (2013.01); *B29C 66/43* (2013.01); *B29C 66/721* (2013.01); *B29C 66/863* (2013.01); *B29C 66/91443* (2013.01); *B32B 3/04* (2013.01); *B32B 7/12* (2013.01); *B32B 27/08* (2013.01); *B32B 27/16* (2013.01); *B32B 27/20* (2013.01); *B32B 27/36* (2013.01); *C09J 5/06* (2013.01); *H05B 6/701* (2013.01); *B29C 66/71* (2013.01); *B29C 66/7212* (2013.01); *B29C 66/7392* (2013.01); *B29C 66/73112* (2013.01); *B29C 66/73921* (2013.01); *B29C 66/742* (2013.01); *B29C 66/74283* (2013.01); *B29C 66/919* (2013.01); *B29C 66/91411* (2013.01); *B29C 66/91631* (2013.01); *B29C 66/949* (2013.01);
(Continued)

(58) Field of Classification Search
CPC .......... B32B 7/12; B32B 3/06; B29C 65/1425; B29C 65/4835; B29C 66/1122; B29C 66/43; B29C 66/721; B29C 66/863; C09J 5/06; H05B 6/701
See application file for complete search history.

(56) References Cited

U.S. PATENT DOCUMENTS 4,383,060 A   5/1983   Dearlove et al.
4,626,642 A   12/1986  Wang et al.
(Continued)

OTHER PUBLICATIONS

H.S. Ku et al., "Application of Variable Frequency Microwave (VFM) to Adhesives," J. of Electromagn., 2005, 19 (11), pp. 1467-1484.
Felix L. Paulauskas et al., "Adhesive Bonding Via Exposure to Variable Frequency Microwave Radiation," Spring Matrials Research Society Meeting, Apr. 8-12, 1996.
(Continued)

*Primary Examiner* — Daniel McNally
(74) *Attorney, Agent, or Firm* — Harness, Dickey & Pierce, P.L.C.

(57) ABSTRACT

A method and apparatus to mitigate the severity of the bond-line read-out defect, and more specifically microwave heating to locally cure adhesive bond-line in a single or two stage process comprising heating thermoset adhesive with microwave radiation until the adhesive is fully cured or partially cured. If the adhesive is partially cured, it can be fully cured by being subjected to an additional thermal cycle.

17 Claims, 5 Drawing Sheets

(51) Int. Cl.

| | | |
|---|---|---|
| *B32B 7/12* | (2006.01) | |
| *B29C 65/48* | (2006.01) | |
| *B29C 65/78* | (2006.01) | |
| *C09J 5/06* | (2006.01) | |
| *H05B 6/70* | (2006.01) | |
| *B32B 27/08* | (2006.01) | |
| *B32B 27/16* | (2006.01) | |
| *B32B 27/20* | (2006.01) | |
| *B32B 27/36* | (2006.01) | |
| *B32B 3/04* | (2006.01) | |
| *F16B 11/00* | (2006.01) | |

(52) U.S. Cl.
CPC ............ *B32B 2262/0253* (2013.01); *B32B 2262/0269* (2013.01); *B32B 2262/101* (2013.01); *B32B 2262/105* (2013.01); *B32B 2605/00* (2013.01); *C09J 2205/31* (2013.01); *F16B 11/006* (2013.01); *Y10T 428/19* (2015.01)

(56) References Cited

U.S. PATENT DOCUMENTS

| | | | | |
|---|---|---|---|---|
| 5,064,494 | A * | 11/1991 | Duck | B29C 35/08 156/273.5 |
| 5,487,853 | A * | 1/1996 | Buckley | 264/496 |
| 5,866,060 | A * | 2/1999 | Buckley | 264/463 |
| 5,998,774 | A * | 12/1999 | Joines et al. | 219/745 |
| 2003/0168640 | A1* | 9/2003 | Kirsten | B29C 35/08 252/500 |
| 2009/0056868 | A1* | 3/2009 | Basu | B29C 65/4835 156/295 |
| 2010/0206469 | A1* | 8/2010 | Van Wijngaarden | 156/245 |
| 2011/0198020 | A1* | 8/2011 | Marengo | B29C 35/0266 156/196 |

OTHER PUBLICATIONS

Kedzie Fernholz et al., "Development of a Tool to Measure Bond-line Read-through Defects," 7th Annual Automotive Composites Conference and Exposition, Sep. 11-13, 2007.

Judit Canadell et al., "Microwave-Accelerated Polymerization of 2-Phenoxymethyl-1,4,6-trioxaspiro[4,4]nonane with Diglycidyl Ether of Bisphenol A," Macromol. Chem. Phys., 2007, 208, pp. 2018-2025.

Harry Ku et al., "Shrinkage Reduction of Thermoset Matric Particle Reinforced Composites During Curing Using Mirowaves Irradiation," The Hong-Long Institute of Engineers Transaction, 11 (3), pp. 29-34.

Shuangjie Zhou et al., "A Study of Microwave Reaction Rate Enhancement Effect in Adhesive Bonding of Polymers and Composites," Composite Structures, 2003, 61, pp. 303-309.

Felix L. Paulauskas et al., "Adhesive Bonding Via Exposure to Variable Frequency Microwave Radiation and Resulting Mechanical Evaluation," Spring Matrials Research Society Meeting, Apr. 8-12, 1996.

Prasad K.D.V. Yarlagadda et al., "Study on the Microwave Curing of Adhesive Joints Using a Temperature-controlled Feedback System," J. of Materials Processing Tech., 1999, 91, pp. 128-149, Published year: 1999.

Fulvio Fontana et al., "Variable Frequency Microwave (VFM) Curing of Die Attach and Underfill Materials," EMPC, Jun. 12-15, 2005.

Copty et al., "Low-power near-field microwave applicator for localized heating of soft matter," Appl. Phys. Lett., 84: 5109-5111 (2004).

Guerquin-Kern et al., "Local Hyperthermia Using Microwaves for Therapeutic purposes—Experimental Studies of Various Applicators," Microwave Power, 16(3&4): 305-311 (1981).

Fuchs et al., "Predicted and Measured Bond-Line Read-Through Response in Composite Automotive Body Panels Subjected to Elevated Temperature Cure," Journal of Adhesion, 86: 982-1011 (2010).

* cited by examiner

METHOD AND APPARATUS TO MITIGATE THE BOND-LINE READ-OUT DEFECT IN ADHESIVE-BONDED COMPOSITE PANELS

CROSS-REFERENCE TO RELATED APPLICATIONS

This application claims the benefit and priority of Indian Patent Application No. 578/KOL/2012, filed May 21, 2012. The entire disclosure of the above application is incorporated herein by reference.

FIELD

The present disclosure relates to adhesive bonding of composite panels, particularly in automotive assembly and finish operations.

BACKGROUND

This section provides background information related to the present disclosure which is not necessarily prior art.

High quality class-A surfaces made using composite sheet molding compound (SMC) panels are typically joined to a support structure using polymeric based thermoset adhesives prior to attaching to the vehicle bodies. For example, exterior SMC door panels are often bonded to an internal reinforcing member by a thermoset adhesive. Typically, adhesive-bonding requires a thermal cure cycle in order to facilitate curing and to produce a strong joint. However, the thermal cure cycle intended to cure the adhesive introduces minute surface distortions in the vicinity of the bond-line known as bond-line read-out (BLRO) which deteriorates the visual appeal of the class-A surface. Significant BLRO often results in part rejection and the subsequent time and cost of rework. There remains a need for a cost effective method and apparatus to mitigate the severity of BLRO defects resulting from the curing of adhesives.

In the automotive practices, a polymeric-based thermoset adhesive is cured using a two-stage process. In the first stage, uncured adhesive is applied between the substrates to be joined. External pressure is then applied upon a bonding fixture to maintain dimensional tolerances as it is subjected to the cure temperature for 3-5 minutes. Heat of about 1 kWh at 10 kW is supplied to the adhesive by conduction via the fixture and the substrate until the adhesive is cured to "green strength," which allows one to handle panels joined by adhesive before the adhesive is completely cured. "Green strength" allows joined panels to continue through assembly while the adhesive continues to cure. Since the heat flow to the adhesive from the fixture occurs through the panels, they experience an overall rise in temperature that results in thermal expansion. This, in combination with any differences in the coefficients of linear thermal expansion (CLTEs) between the panels, leads to distortion of the bond-line. At the same time, the adhesive itself marginally distorts due to chemical cure shrinkage. As the adhesive cures partially to green strength, a fraction of these distortions are retained in the joint. The panels joined to green strength are then painted in a paint booth followed by additional heating to cure the paint. The paint "bake" cycle requires another 20-30 minutes of heating of the assembly, resulting in further surface distortion. This process takes a total of about 40 minutes at about 31 kWh per part.

The unwanted side effects of curing adhesives with heat in current practices include the waste of energy spent in the undesired heating of the substrates and surface distortion due to SMC thermal expansion and dimensional changes, or BLRO. There remains a need for a cost-effective method and apparatus to mitigate the severity of BLRO defects resulting from the curing of adhesives.

SUMMARY

This section provides a general summary rather than a comprehensive disclosure of the invention and all of its features.

The disclosed method eliminates or minimizes BLRO. BLRO is an optical defect attributed to minute surface distortions in the vicinity of a bond-line between composite panels. The BLRO defect forms when a relative thermal expansion is locked in between the panels during the thermal cure process. Other factors, such as thermal expansion and shrinkage of the adhesive during the thermal cure process, also contribute to the severity of the defect.

The method now disclosed manages significant sources of BLRO, namely, the differential linear thermal expansion in the substrates and the volumetric shrinkage in the adhesive, by utilizing microwave heating to at least partially cure the adhesive. The adhesive is heated using microwaves at suitable frequency (for example, 2-3 GHz, typically 2.45 GHz) to which many polymeric substrates are transparent. It is understood that substrates are not 100% transparent and that it is expected that the substrate will absorb a small amount (for example, about 10% depending on its chemical composition) of the total heat deposited in the adhesive. SMC panels are an example of a substrate that is substantially transparent to microwaves at such frequencies. In most adhesives used in the automotive practice, a significant quantum of microwave radiation is deposited in the adhesive as heat, whereas the substrates' limited exposure to microwave radiation restricts their differential or relative thermal expansion. We found that the disclosed method reduces the severity of the BLRO defect significantly. Furthermore, the disclosed method is more efficient than conventional bonding methods because microwave heating is rapid and localized, resulting in shorter cycle times and a lower specific energy requirement per unit length of bond-line.

Further disclosed is an apparatus having a generator, a waveguide and an open-ended microwave applicator that is used to cure the adhesive. The microwave radiation derived from the generator is transmitted via the waveguide to the microwave applicator, which transmits the radiation to the workpiece. An "open-ended microwave applicator" is an applicator that directs microwaves to a workpiece that is external to the microwave applicator. Open-ended microwave applicators utilize the "fringing field" effects to impart energy to a workpiece. In various embodiments, the open-ended applicator is a transverse electromagnetic mode transmission line-type applicator that uses the fringing field effect to impart energy to cure the adhesive. The workpiece need not be in contact with the open-ended microwave applicator to be heated by the microwaves. An open-ended microwave applicator can have a single slot or multiple slots for emission of microwaves across a narrow width. Furthermore, applicators with multiple slots and a lens, known in the art as slotted-lens applicators, focus fringe-fields to a smaller region in the workpiece. An open-ended microwave applicator can be used in at least two configurations to mitigate BLRO defect. In one configuration, an adhesive can be fully cured using a single-step microwave curing cycle. "Fully cured" refers to a conversion level at which the adhesive has attained full-strength or cannot be cured any further. In a second configuration, an open-ended microwave applicator is used to direct microwaves on adhesive to partially cure the adhesive to at least its green strength. "Partially cured" refers to a conversion level at which adhesive is cured to or above its green strength, but not fully cured. By partially curing the adhesive, the partially bonded substrates resist deformation in subsequent assembly operations such as painting.

In another embodiment of the method, uncured adhesive is applied along the bond-line between two substrates. The "bond-line" is the line along which two substrates are joined together. An open-ended microwave applicator embedded in a bonding fixture is positioned above the bond-line so that microwaves will be focused on the bond-line. In addition to its primary function of applying pressure to maintain dimensional tolerances in the joint, a "bonding fixture" is a fixture that also aligns the open-ended applicator directly above the bond-line and shields the panels from stray microwaves. A generator generates microwaves that are emitted out of the open-ended applicator to heat the adhesive until the substrates are at least partially bonded together. If necessary, the substrates are then heated in an oven to fully cure the adhesive. One method of performing this heating step includes subjecting the partially-bonded panels to a thermal cycle in which the partially-bonded panels traverse a chamber while heat is emitted by the chamber walls. The adhesive that joins the panels is fully cured when the panels exit the chamber.

In a further embodiment, uncured adhesive is applied along the bond-line between two substrates. An open-ended microwave applicator embedded in a bonding fixture is positioned directly above the bond-line. A microwave generator generates microwaves that are transmitted via the waveguide and emitted out of the open-ended microwave applicator to heat the adhesive until the adhesive is fully cured.

In yet another embodiment, microwaves are applied to the adhesive by an open-ended applicator of an articulated robotic system. A microwave generator produces microwaves, which traverse a waveguide and exit through a microwave applicator having at least one slot located at a terminus of an articulated robotic system. In this embodiment, a bonding fixture is placed directly above the bond-line. The robotic system directs the microwave applicator in the direction of the bond-line to focus the microwaves on the adhesive. Directing microwaves along the bond-line allows for rapid and localized application of heat to cure the adhesive and reduces cycle time and improves the efficiency of the process.

In various embodiments, the curing step may incorporate the use of variable frequency microwaves (VFMs). In these embodiments, VFM generators sweep through a bandwidth of frequencies to generate VFMs, which allow for controlled and uniform distribution of microwave energy thereby preventing "hot-spots" and "thermal runaways" in the material being heated.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

It should be noted that the figures are intended to exemplify the general characteristics of materials and methods among those of the disclosed technology, for the purpose of the description of certain embodiments. These figures may not precisely reflect the characteristics of any given embodiment, and are not necessarily intended to define or limit specific embodiments within the scope of this technology.

DETAILED DESCRIPTION

A detailed description of exemplary, nonlimiting embodiments with reference to the accompanying drawings follows. It will be apparent to those skilled in the art that certain specific details need not be employed, that example embodiments may take many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. The singular forms "a," "an," and "the" may be intended to include the plural forms as well, unless the context clearly indicates otherwise. The terms "comprises" and "comprising" are inclusive and therefore specify the presence of stated features, steps, elements, or components, but do not preclude the presence or addition of one or more other features, steps, elements, components, or groups of these.

All numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. In addition, disclosures of numerical ranges include disclosure of all possible values and subdivided ranges within the entire range, whether or not exemplary included values or subdivided ranges are also given.

Microwave/radio frequency (RF) technology is utilized to mitigate the severity of bond-line read-out (BLRO) defect by reducing or minimizing thermal expansion of substrates being joined and total volume adhesive shrinkage associated with thermal cure cycles for the adhesive used in joining the substrates. Curing the adhesive with microwave heating rapidly applies heat only to the adhesive locally near the bond-line, reducing the severity of the BLRO defect.

This technology contemplates polymeric substrates that are substantially penetrable by microwave radiation. In various embodiments, preferred substrates are composites. Composites are classified based on the matrix used and reinforcing material used in the formation of the composite material. Many polymer matrix composites (PMCs) are substantially penetrable by microwave radiation. A substrate that does not need to be penetrated by microwaves during the process is not required to be a composite, and can be metal or steel.

Figures 1, 2:
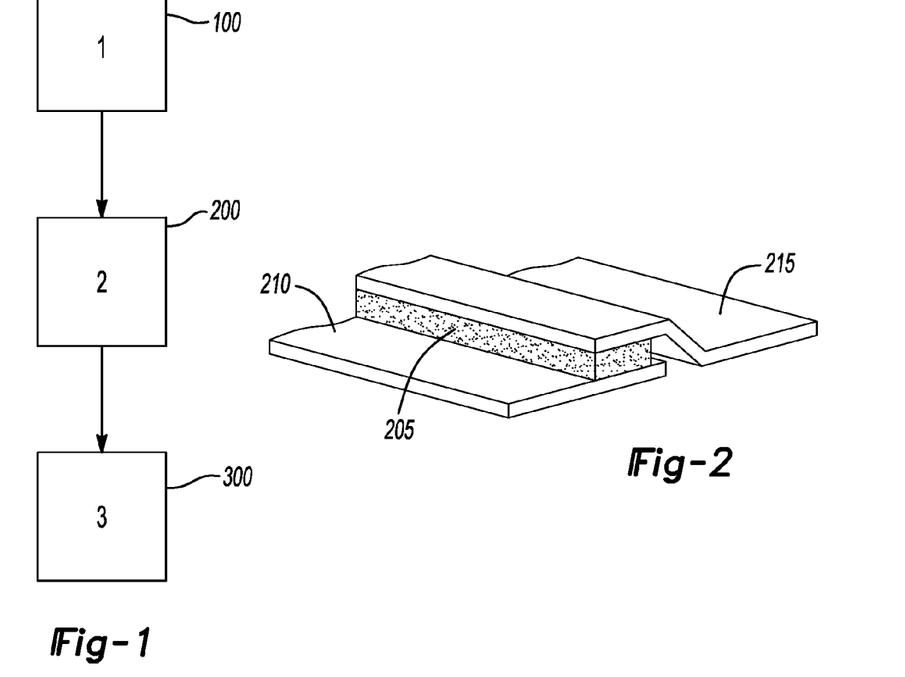
FIG. 1 is a diagrammatic illustration of a method to mitigate the BLRO defect in adhesive-bonded composite panels.
FIG. 2 is a diagrammatic illustration of thermoset adhesive along the bond-line between two substrates.

FIG. 1 is an illustration of a two or three step method for mitigating BLRO defects in thermoset adhesive-bonded composite panels by heating the thermoset adhesive, including a first step 100, a second step 200 and optionally a third step 300. Thermoset adhesives are crosslinking polymeric resins that are cured using heat or heat and pressure. Preferred thermoset adhesives are those with polar chemical functional groups to interact with the microwave energy. Nonlimiting examples of thermoset adhesives include phenolics, melamines, resorcinol formaldehydes, furans, polyesters, polyimides, urea formaldehyde, acrylics, elastomers, amines, epoxies (including those cured with amine crosslinkers), polyurethanes, natural and synthetic rubbers, silicone compounds, fluoropolymers and phenolics. Fixed frequency microwaves (FFMs) can be used as a heating source. FFMs allow for the heating of adhesive at a fixed frequency. Nonlimiting frequencies of microwaves that can be used to cure thermoset adhesive range from about 0.5 MHz to about 10 GHz. Additionally, variable frequency microwaves (VFMs) are also contemplated as a heating source. VFMs provide a controlled and uniform distribution of microwave energy. A VFM generator operates around a central frequency and sweeps through a bandwidth of frequencies to generate VFMs at a constant power. The central frequency can range from about 1 GHz to about 10 GHz and the sweeping bandwidth of frequencies can range from about 1 GHz to about 5 GHz. While the VFM generator sweeps through a bandwidth of frequencies, the microwaves are emitted at a constant power. The power is held constant at a level between about 0.1 and about 10 kW.

The first step 100 of the method shown in FIG. 1 includes applying a volume of uncured thermoset adhesive between two substrates. This step 100 may take up to about 5 minutes. More specifically, this step 100 can take 1-2 minutes.

FIG. 2 is a diagrammatic illustration depicting a volume of uncured adhesive 205 applied along a bond-line between a left-hand substrate 210 and a right-hand substrate 215 according to the first step 100. The bond line is the overlap of the left-hand substrate 210 with the right-hand substrate 215.

Figure 3:
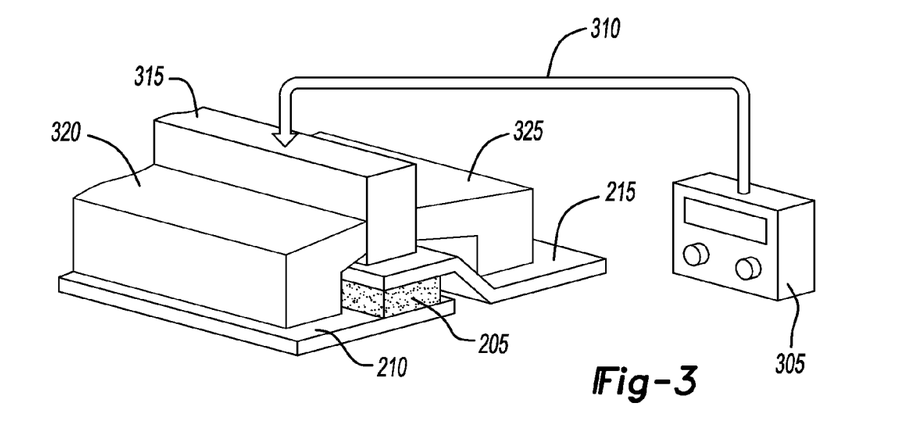
FIG. 3 is a diagrammatic illustration of an apparatus for curing thermoset adhesive between two substrates with minimal or no BLRO.

The substrates 210 and 215 may be composites such as PMCs that are substantially penetrable by microwave radiation. One example of polymers suitable for PMCs are polyesters. Sheet molding compound (SMC), which has a polyester matrix filled with fiber, is one preferred substrate. Nonlimiting examples of fibers used for reinforcement include glass fibers, fiber glass, carbon fibers, aramid, and ultra-high molecular weight polyethylene. Particularly relevant substrates are glass fiber-reinforced SMCs. Additional substrates, such as glass fiber-reinforced thermoplastics, and combinations of substrates that are suitable for this method would be known to a person of ordinary skill in the art. The substrates that are adhesively joined may be of the same material or they may be different materials. A substrate that does not need to be penetrated by microwaves during the process is not required to be a composite, and can be metal or steel. For example, if the microwaves are applied through the right-hand substrate 215, then the left-hand substrate 210 can be metal, steel or another material that is impenetrable by microwaves or it can be a material that is penetrable by microwaves. Referring now to FIG. 3, only the substrate 215 that is between the adhesive 205 and a microwave applicator 315 is required to be penetrable by microwaves.

Turning back to FIG. 1, in the second step 200 microwaves are applied through a substrate and to the adhesive. Microwaves heat the adhesive until the substrates are partially bonded together or fully bonded together. Fixed frequency microwaves and variable frequency microwaves are contemplated as heating sources.

In an embodiment, the microwaves can be fixed frequency microwaves (FFMs). Nonlimiting frequencies of microwaves that can be used to cure adhesive range from about 0.5 MHz to about 10 GHz. More specifically, the frequency can be about 0.5 GHz, about 1 GHz, about 2 GHz, about 2.45 GHz, about 3 GHz, about 4 GHz, about 5 GHz, about 6 GHz, about 7 GHz, about 8 GHz, about 9 GHz or about 10 GHz.

In a preferred embodiment, variable frequency microwaves (VFMs) are utilized for controlled and uniform distribution of microwave energy, which reduces "hotspots" and "thermal runaways" associated with FFMs. A VFM generator operates around a central frequency and sweeps through a bandwidth of frequencies to generate VFMs at a constant power. The bandwidth of frequencies can range from about 1 to about 10 GHz. For example, the central frequency can be from about 0.9 to about 8 GHz with a sweep at a bandwidth of up to about 4 GHz from the central frequency. In a preferred embodiment, the central frequency is about 5.03 GHz with frequency sweeps of about 1.0 GHz, of about 2.0 GHz, of about 3.0 GHz or of about 4.0 GHz. More specifically, the frequencies can be swept from about 0.9 GHz to about 2.45 GHz on the low side, from about 2.45 GHz to about 5 GHz in a mid-range, or from about 5 GHz to about 8 GHz at a high range. The central frequency and sweep bandwidth are chosen based on the adhesive used and the substrate compositions. While the VFM generator sweeps through the bandwidth of frequencies, the microwaves are emitted at a constant power. The power is held constant at a level between about 0.1 and about 10 kW. More specifically, the power is held constant at about 10 kW, or at about 9 kW, or at about 8 kW, or at about 7 kW, or at about 6 kW, or at about 5 kW, or at about 4 kW, or at about 3 kW or at about 2 kW or at about 1 kW or at about 0.75 kW, or at about 0.5 kW, or at about 0.25 kW, or at about 0.1 kW. With the use of VFMs, this step 200 typically requires 0.15-0.25 kWh at 8 kW for about 0.5 up to about 5 minutes to partially cure the adhesive. More specifically, this second step 200 may take 1-2 minutes to partially cure the adhesive. Alternatively, with the use of VFMs, this step 200 typically requires 0.75-1.5 kWh at 8 kW for about 5 up to about 10 minutes to fully cure the adhesive.

The microwaves applied in the second step 200 can be applied by an apparatus such as the apparatus depicted in FIG. 3 comprising a microwave generator 305, which generates microwaves that traverse a waveguide 310 to be emitted by a microwave applicator 315. The microwave generator 305 can be a fixed frequency microwave generator or a variable frequency microwave generator. The microwave applicator can be positioned above the bond line to focus the emission of microwaves through a substrate 215 to the adhesive 205. To prevent the undesired heating of the substrates on either side of the bond-line, a left-hand bonding fixture 320 and a right-hand bonding fixture 325 can be positioned on the substrates to absorb stray microwaves. Alternatively, the bonding fixtures 320 and 325 can be connected to the microwave applicator 315. Microwaves are emitted out of the microwave applicator 315 until the uncured adhesive 205 is fully cured or partially cured.

Figure 4:
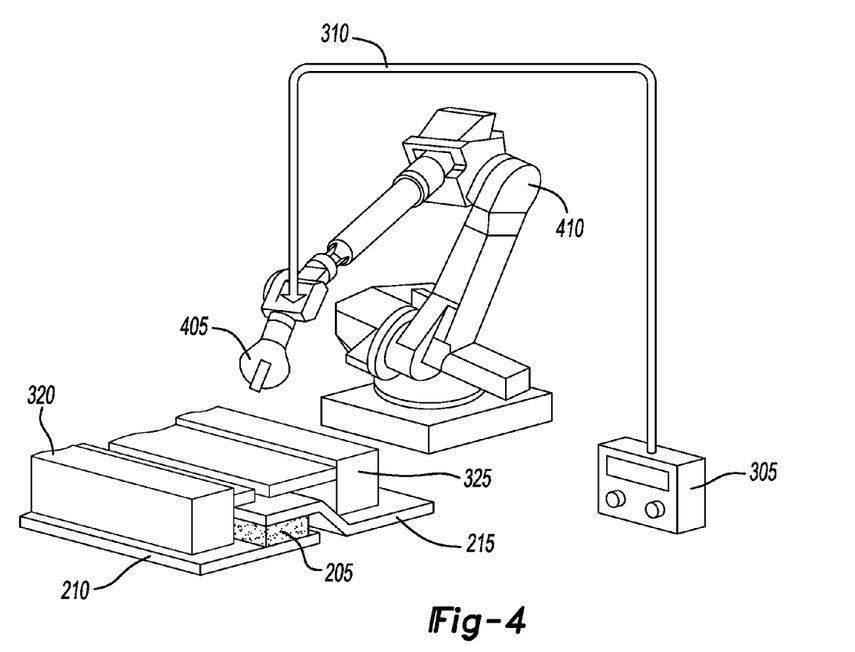
FIG. 4 is a diagrammatic illustration of an open-ended microwave applicator attached to a robotic system for curing adhesive along a bond-line between two substrates.
Figure 5:
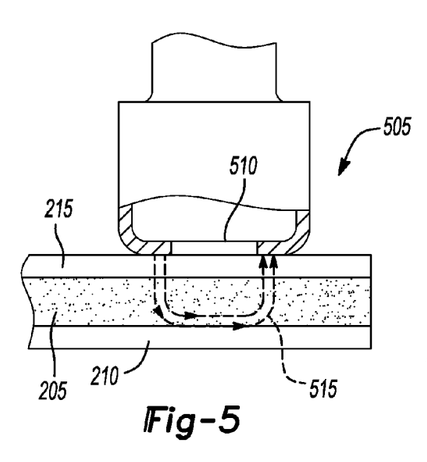
FIG. 5 is a diagrammatic illustration of an open-ended microwave applicator with a single slot.

In a preferred aspect, the microwave heating required in the second step 200 are applied by an open-ended microwave applicator on an articulated robotic system as depicted in FIG. 4. The use of an open-ended microwave applicator on an articulated robotic system is beneficial due to the great flexibility it provides to cure adhesive in complex bond-line configurations. The same system can be used to cure adhesive in multiple bond-line configurations without modifications. A microwave generator 305 produces the microwave, which traverses a waveguide 310 and exits through an open-ended microwave applicator 405 located at a terminus of an articulated robotic system 410. The open-ended microwave applicator 405 can have multiple slots or be a single-slot microwave applicator as shown in the illustration of FIG. 5. In FIG. 5, a single-slot microwave applicator 505 is positioned above the right handed substrate 215. The single-slot microwave applicator has a single slot 510 through which a fringing field 515 is directed to the adhesive 205.

Figure 6:
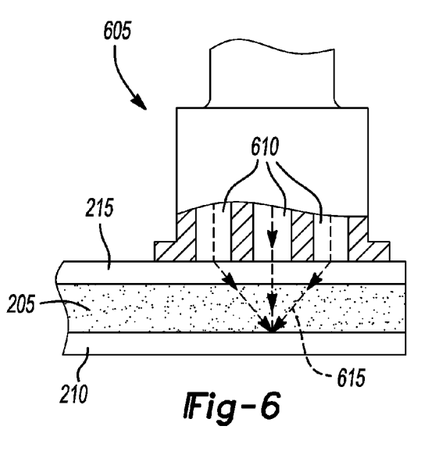
FIG. 6 is a diagrammatic illustration of a slotted-lens microwave applicator.

Alternatively, the open-ended microwave applicator can be a slotted-lens microwave applicator as depicted in the illustration of FIG. 6. In FIG. 6, a microwave applicator 605 is positioned above the right handed substrate 215. The microwave applicator 605 has multiple slots 610 and a lens through which microwave radiation 615 is emitted to a concentrated region or point.

Referring again to FIG. 4, the microwave generator 305 can be a fixed frequency microwave generator or a variable frequency microwave generator. A left-hand bonding fixture 320 and a right-hand bonding fixture 325 flank the bond-line on the substrates 210 and 215. The robotic system 410 then moves the open-ended microwave applicator 405 across an exposed bond-line until the adhesive 205 is fully cured or partially cured. This method allows for rapid and localized application of heating to cure the adhesive, reduces cycle time, improves the efficiency of the process, and allows for reconfiguration to suit any component shape and of even complex bondlines.

Figure 7:
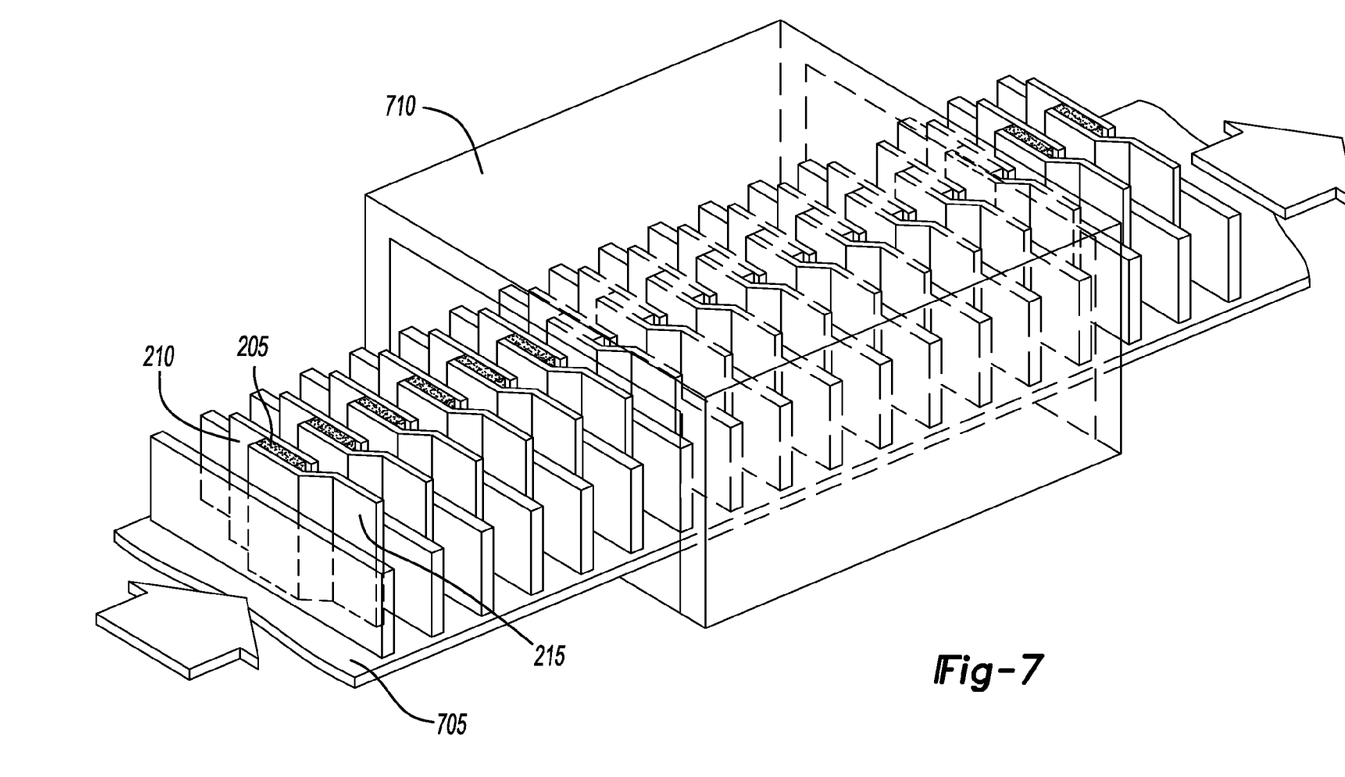
FIG. 7 is a diagrammatic illustration of partially bonded panels being subjected to a thermal cycle.

Referring again to FIG. 1, in an optional third step 300 of this method, if the adhesive is not fully cured by microwave radiation in the second step 200, the partially bonded substrates are heated to fully cure the adhesive. As shown in FIG. 7, the partially-bonded substrates 210 and 215 may be loaded onto a cart or belt 705 that traverses a heated chamber 710 while heat is emitted by the chamber walls using conventional heating systems such as convection ovens, etc. The arrows represent the movement of the cart or belt 705 through the heated chamber 710. The adhesive 205 that joins the substrates 210 and 215 is fully cured when the panels exit the heated chamber 710. This step 300 typically requires 20-30 kWh at about 40 to about 80 kW for up to about 30 minutes at which time the adhesive 205 is fully cured. More specifically, this step may take 20-30 minutes. In total, the entire three-step method of FIG. 1 takes about 35 minutes, necessitates about 30 kWh per part and results in minimal BLRO, whereas the conventional method described above requires about 40 minutes, necessitates about 31 kWh per part and results in significant BLRO. Alternatively, if the adhesive is fully cured in the second step 200 of the method of FIG. 1, only about 12 minutes at about 2 kWh per part is required and minimal or no BLRO results.

EXAMPLES

Figure 8:
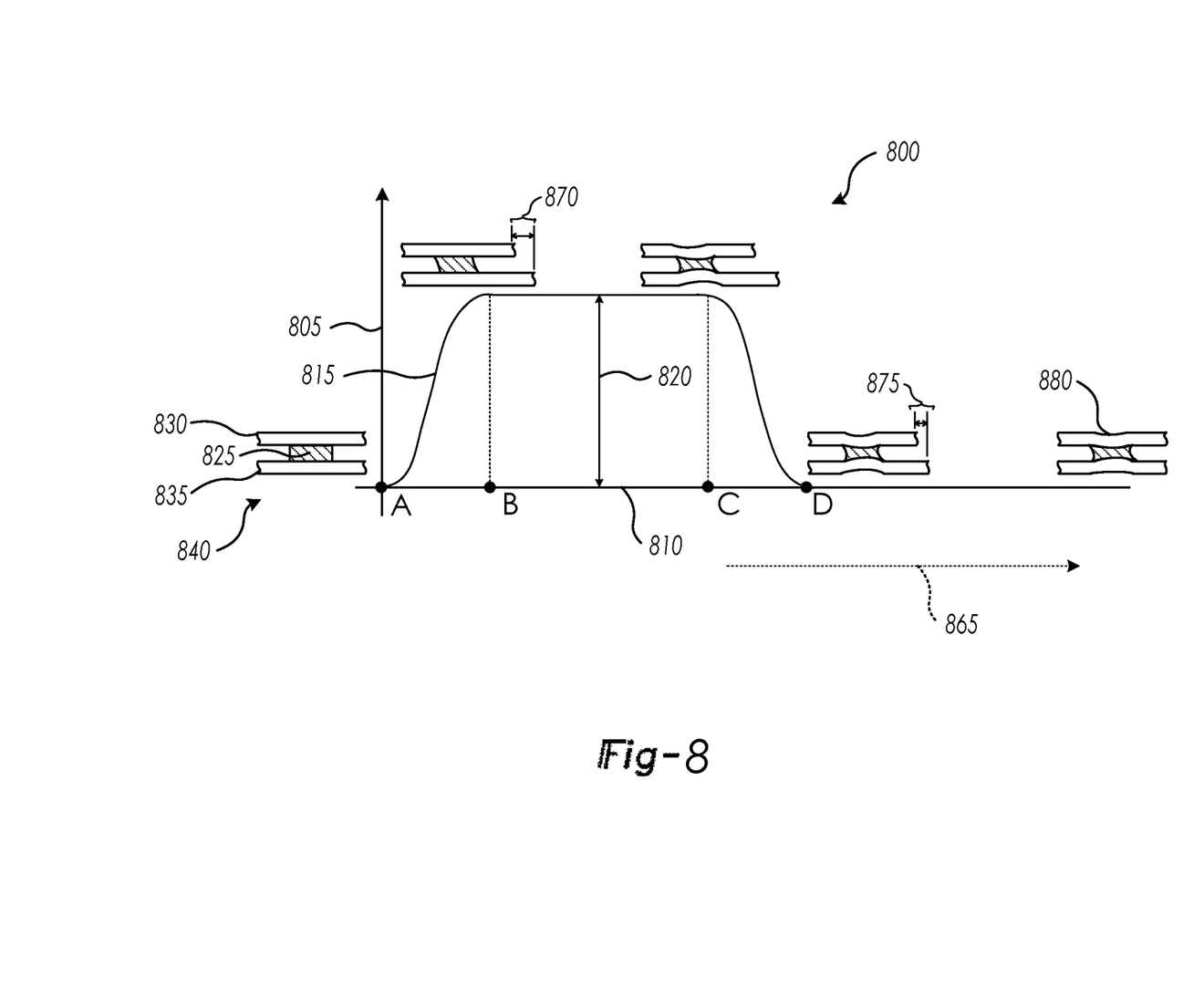
FIG. 8 is diagrammatic illustration of a computer model for predicting BLRO.

The methods of the present technology are illustrated in the following non-limiting examples. The numbers presented in the following are calculated and predicted using computer models developed for BLRO analysis. FIG. 8 is a depiction of a computer model 800 that tracks the evolution of BLRO with contribution from both quantum displacement of a substrate ($\Delta u$) and shrinkage of an adhesive ($\epsilon_v$). In FIG. 8, a y-axis 805 represents the temperature in degrees Celsius of the bond-line during a thermal cure cycle, an x-axis 810 represents time during the thermal cure cycle in minutes, a curve 815 represents the change in temperature over time and an arrow 820 represents change in temperature $\Delta T$. The computer model 800 shows that before heating, adhesive 825 is applied between an upper substrate 830 and a lower substrate 835 to form a bonding assembly 840. The curing process begins at point A when heat is applied to the bonding assembly 840. The temperature of the bond-line rises to a maximum temperature at point B and the bonding assembly 840 bakes until a time represented by point C. The bonding assembly 840 cools from point C until a time represented by point D, at which point the curing process is finished. The cured adhesive undergoes viscoelastic relaxation during and after the cooling process as represented by an arrow 865. When heat is applied to the bonding assembly 840 at about point B, the volume of the adhesive 825 changes due to a quantity $CTE_{adh}\Delta T$, where $CTE_{adh}$ is the coefficient of thermal expansion of the adhesive. Additionally, after the application of heat to the bonding assembly 840 at about point B, a quantum relative displacement, $\Delta u$ 870, between the substrates 830, 835 is calculated by $\Delta u = w\Delta T\ \Delta CTE_{sub}$, where w is the width of the bond-line, and $CTE_{sub}$ is the coefficient of thermal expansion of the substrates 830, 835. By about point C, the contributions to BLRO from volumetric cure shrinkage, $\epsilon_v$, increase significantly. When the bonding assembly 840 is cooled at point D, the change in volume, $\Delta V$, of the adhesive 825 is $3(CTE_{adh}^{T>Tg} - CTE_{adh}^{T<Tg})\ \Delta T + \epsilon_v$ at full conversion where $T_g$ is the glass transition temperature of the adhesive. Also at about point D, $\Delta u$ 875 is different from $\Delta u$ 870 at point C, and a part of the $\Delta u$ 875 is permanent. After the viscoelastic relaxation of the adhesive 865, the BLRO 880 is calculated from the computer model 800. The computer model 800 continuously tracks the evolution of both $\Delta u$ and $\epsilon_v$ to calculate the final BLRO under any given cure conditions. Where an entire bonding assembly is heated, it is expected that the contributions from $\Delta u$ and $\epsilon_v$ will be very large.

The computer model 800 was tested and validated using experimental samples that were thermally cured. The test consisted of mixed, uncured components of Lord® 320/322 and uncured Lord® 380/383 adhesives from Lord Corp. (Cary, N.C., USA) applied between glass fiber-reinforced SMC panels to form bonding assemblies. As thermally-cured controls, a bonding assembly of the SMC panels with the Lord® 320/322 adhesive and a bonding assembly of the SMC panels with the Lord® 380/383 adhesive were fully cured in an oven. The BLRO was calculated using the computer model. Also, BLRO in these samples was then determined by Visuol Technologies's ONDULO technology (Metz, FR). ONDULO technology relies on the principle of defectometry, which is the evaluation of the distortion of a reflection on a surface to determine the distortion in the surface itself.

Figure 9:
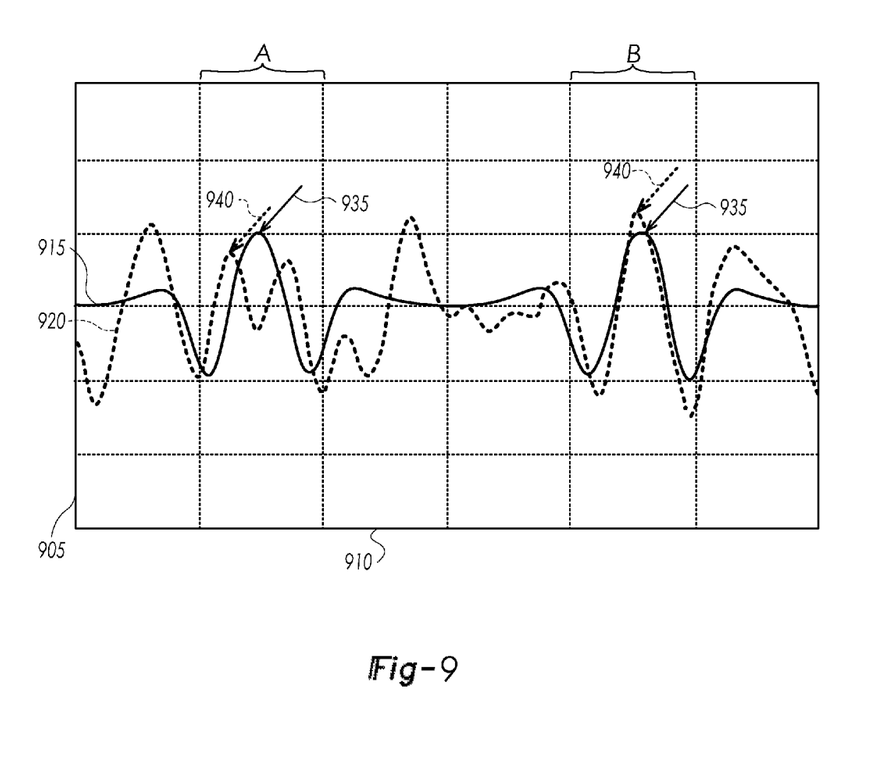
FIG. 9 is a graph showing curvature profiles for a BLRO calculated by the computer model and a BLRO experimentally measured for thermally-cured controls.

An example comparison of surface curvature predicted from the computer model 800 with those experimentally measured using ONDULO® technology on thermally-cured SMC panels (controls) is shown in the graph of FIG. 9. In FIG. 9, a y-axis 905 represents the surface curvature ($m^{-1}$), an x-axis 910 represents the distance across the bond-line from a plate center (mm), a solid line 915 represents a curvature profile calculated from the computer model (FIG. 8, numeral 800), and a dotted line 920 represents an experimentally measured curvature profile of thermally-cured SMC panels. The curvature profiles 915 and 920 are in the vicinity of the bond-line where they cross column A and column B and the BLRO severity is identified from the peaks in the vicinity of the bond-line represented by the solid arrows 935 for the computer model results and by dotted arrows 940 for the thermally-cured controls. The overlap of the peaks demonstrates that the computer model is an accurate representation of actual BLRO in bonded substrates.

In a first prediction, computer models were used to calculate what the BLRO would be for the case if bonded assemblies are exposed to microwave radiation to "fully cure" or "partially cure" the adhesive. The predicted BLRO detected in the bonding assemblies subjected to microwave heating according to the model were compared relative to the thermally-cured controls there were regarded as 100%.

According to the computer model, where adhesive is "fully cured" by the use of microwave radiation in the second step, the calculated BLRO for assemblies with glass fiber-reinforced SMC panels bonded using Lord® 320/322 and Lord® 380/383 epoxy adhesives showed 68% and 67% decreases in BLRO, respectively, relative to the corresponding thermally-cured controls. These results demonstrate that BLRO can be reduced significantly by the microwave curing method.

In a second prediction, computer models were used to calculate what the BLRO would be for the case if bonded assemblies are exposed to microwave radiation to "partially cure" the adhesive (Lord® 320/200 and Lord® 380/383) in the second step prior to being fully cured by heat in an oven. According to the computer model, when the Lord® 320/322 adhesive is partially cured to 60%, 75% and 90% before being fully cured by heating in an oven, the calculated BLRO decreases by 33%, 39% and 44% respectively in relation to the corresponding thermally-cured controls. Also according to the computer model, when the Lord® 380/383 adhesive is partially cured to 60%, 75% and 90% before being fully cured by heating in an oven, the calculated BLRO decreases by 54%, 61% and 66% respectively in relation to the corresponding thermally-cure controls. These results again demonstrate that BLRO can be reduced significantly by the current technology.

The foregoing description of the embodiments and examples are provided for purposes of illustration and description. They are not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method of bonding two substrates comprising:
   (a) applying uncured adhesive along a line along which two substrates are to be bonded together, wherein one of the two substrates is a polymer matrix composite substrate and the other of the two substrates is a metal;
   (b) positioning, along the line along which the two substrates are to be bonded together, a first bonding fixture on the polymer matrix composite substrate and a second bonding fixture on the metal substrate;
   (c) applying microwave radiation only through the polymer matrix composite substrate to heat the polymer matrix composite and the uncured adhesive until the uncured adhesive is at least partially cured, wherein the first and second bonding fixtures absorb stray microwaves and prevent heating of the polymer matrix composite substrate on either side of the line; and
   (d) fully curing the adhesive,
   whereby bond-line read-out (BLRO) is minimized relative to a comparative BLRO of a comparative assembly having the polymer matrix composite substrate bonded together to the metal substrate by an adhesive cured with heat only without the application of microwave radiation.

2. A method according to claim 1, wherein the microwave radiation comprises variable frequency microwaves with a bandwidth of frequencies.

3. A method according to claim 2, wherein the microwaves have a power of between about 5 and about 10 kW.

4. A method according to claim 3, wherein the microwaves are applied through a microwave applicator having at least one slot.

5. A method according to claim 4, wherein the microwave radiation is applied by a microwave applicator having at least one slot on an articulated robotic system.

6. A method according to claim 5, wherein the bandwidth of frequencies is from about 4.03 GHz to about 6.03 GHz.

7. A method according to claim 5, wherein the BLRO is reduced at least about 25% relative to panels bonded by heat not provided from microwaves.

8. A method according to claim 1, wherein the polymer matrix composite substrate is glass fiber-reinforced sheet molding compound.

9. A method according to claim 1, wherein the applying microwave radiation comprises applying microwave radiation having a power of about 8 kW for about 1 to about 2 minutes.

10. A method according to claim 1, wherein from about 0.15 to about 0.25 kWh at about 5 kW to about 10 kW is applied in step (b) for up to about 5 minutes.

11. A method according to claim 1, wherein the fully curing the adhesive comprises heating the adhesive with from about 20 KWh to about 30 kWh at about 40 kW to about 80 kW for about 20-30 minutes.

12. A method according to claim 1, wherein the adhesive is heated by microwave radiation until fully cured.

13. A method according to claim 1, wherein step (c) is performed with an open-ended microwave applicator flanked on both sides by the first and second bonding fixture.

14. A method according to claim 1, wherein the fully curing the adhesive further comprises heating the adhesive until the adhesive is fully cured.

15. A method according to claim 1, wherein the other of the two substrates that is metal is a steel.

16. A method according to claim 1, wherein the fully curing the adhesive comprises heating the two substrates in an oven until the adhesive is fully cured.

17. A method according to claim 1, wherein the applying microwave radiation only through the polymer matrix composite comprises locally applying microwave radiation only through the polymer matrix composite along the line along which the two substrates are to be bonded together.

* * * * *